US012374536B2

(12) United States Patent
Chernyshev et al.

(10) Patent No.: US 12,374,536 B2
(45) Date of Patent: Jul. 29, 2025

(54) METHODS AND APPARATUS FOR MASS SPECTROMETRY

(71) Applicant: Thermo Fisher Scientific (Bremen) GmbH, Bremen (DE)

(72) Inventors: Denis Chernyshev, Bremen (DE); Nicolaie Eugen Damoc, Bremen (DE); Christian Thoeing, Bremen (DE); Jen-Peter Hauschild, Bremen (DE); Alexander Makarov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 39 days.

(21) Appl. No.: 17/597,362

(22) PCT Filed: Jun. 24, 2020

(86) PCT No.: PCT/EP2020/067749

§ 371 (c)(1),
(2) Date: Jan. 4, 2022

(87) PCT Pub. No.: WO2021/001246

PCT Pub. Date: Jan. 7, 2021

(65) Prior Publication Data

US 2024/0203716 A1 Jun. 20, 2024

(51) Int. Cl.
*H01J 49/00* (2006.01)
*H01J 49/40* (2006.01)

(52) U.S. Cl.
CPC ...... *H01J 49/0031* (2013.01); *H01J 49/0009* (2013.01); *H01J 49/0045* (2013.01); *H01J 49/40* (2013.01)

(58) Field of Classification Search
CPC ............... H01J 49/0031; H01J 49/0009; H01J 49/0045; H01J 49/40; H01J 49/0027
USPC .................................................. 250/281, 282
See application file for complete search history.

(56) References Cited

U.S. PATENT DOCUMENTS

| | | | | |
|---|---|---|---|---|
| 6,586,727 B2 | 7/2003 | Bateman et al. | | |
| 6,717,130 B2 | 4/2004 | Bateman et al. | | |
| 2006/0151689 A1* | 7/2006 | Bateman ................ | H01J 49/34 | 250/288 |
| 2011/0186727 A1* | 8/2011 | Loboda .................. | H01J 49/40 | 250/282 |

(Continued)

OTHER PUBLICATIONS

PCT Written Opinion of the International Searching Authority, issued for PCT/EP2020/067749, Filed Jun. 24, 2020.

*Primary Examiner* — Michael Maskell

(57) ABSTRACT

Method and system of mass spectrometry is provided. The method comprises performing a first and a second MS1 scans on precursor ions produced by ionising a sample. The first MS1 scan comprises mass analysing a first set of the precursor ions transported to a mass analyser using an ion transport device operated at a first setting. The second MS1 scan comprises mass analysing a second set of the precursor ions transported to a mass analyser using the ion transport device operated at a second setting. Energies imparted on the precursor ions by the ion transport device are different in the first and second settings. Based on intensities of mass spectral peaks of the first and second MS1 scans, a mass spectral peak in at least one of the first MS1 scan or the second MS1 scan indicative of a precursor ion mass spectral peak is determined.

28 Claims, 6 Drawing Sheets

(56) References Cited

U.S. PATENT DOCUMENTS

| | | | |
|---|---|---|---|
| 2014/0306106 | A1 | 10/2014 | Olney |
| 2015/0340213 | A1 | 11/2015 | Belov |

* cited by examiner

METHODS AND APPARATUS FOR MASS SPECTROMETRY

FIELD OF THE DISCLOSURE

This disclosure relates to methods of mass spectrometry and a mass spectrometer. In particular, this disclosure relates to methods of data dependent mass spectrometry and data independent mass spectrometry.

BACKGROUND

Mass spectrometry is a long established technique for identification and quantitation of often complex mixtures of large organic molecules. In recent years, techniques have been developed that allow analysis of a wide range of both biological and non-biological materials, with application across fields such as law enforcement (e.g. identification of drugs and explosives materials), environmental monitoring, food safety, pharmaceutical and other scientific research, and biology (e.g. in proteomics, the study of simple and complex mixtures of proteins, with applications in drug discovery, disease identification and so forth).

Proteins, comprising large numbers of amino acids, are typically of high molecular weight. Thus accurate identification and quantitation of the intact protein by direct mass spectrometric measurement is challenging. It is thus well known to carry out fragmentation of the precursor protein ions (top-down proteomics). A variety of fragmentation techniques is known, which may result in the generation of different fragment ions from the precursor ions. Moreover, the fragmentation mechanism may be affected by different applied fragmentation energies. Samples containing proteins may also be broken down by digestion to produce smaller peptides that are then analysed by mass spectrometry (bottom-up proteomics), often also involving fragmentation of the peptides to assist identification.

Tandem mass spectrometry is a method of mass spectrometry in which precursor ions are generated from a sample, selected by a first mass filter or mass analyser, and then passed to a fragmentation chamber. The precursor ions within the fragmentation chamber are subsequently fragmented to form product ions. Fragmentation of the precursor ions may be affected by collisions with a collision gas in the chamber or by other techniques such as electron transfer dissociation or photodissociation. The product ions are then analysed by a mass analyser. The resulting product ion spectra can be used to identify the chemical identity and/or structure of the precursor ion, and thereby identify the precursor.

Analysis of samples can broadly be separated into data independent analysis/acquisition (DIA) and data dependent analysis/acquisition (DDA).

DIA seeks to determine the molecular structure of sample molecules using an approach wherein the first mass filter in a tandem mass spectrometer is set to pass all ions within a selected range of m/z. This range of precursor ions is then fragmented in the second stage of the tandem mass spectrometer and the resulting fragments are subsequently analysed in the third stage of the tandem mass spectrometer.

DDA, by contrast identifies a fixed number of precursor ion species, selects precursor ions of particular mass-to-charge ratio and analyses those via tandem mass spectrometry. The determination of which precursor ion species are of interest in DDA may be based upon intensity ranking ("TopN" method). for example, the top ten most abundant species as observed by peaks in a precursor mass spectrum, hereafter referred to as "MS1"), or by defining an "inclusion list" of precursor mass spectral peaks (for example by user selection), from which fragment spectra—hereafter referred to as "MS2"—are always acquired regardless of the intensity ranking of the peak in the precursor mass spectrum (MS1). Still otherwise, an "exclusion list" of peaks in MS1 can be defined, for example by a user, based e.g. on prior knowledge of the expected sample contents.

Accordingly, it is desirable for DDA methodologies in particular to accurately identify precursor ions in the MS1 mass spectrum for further analysis.

Various ion transport devices may be provided in a tandem mass spectrometer in order to manipulate and guide ions through the tandem mass spectrometer. Typically, ion transport devices use RF and/or DC fields to manipulate and guide the ions. In some instances, the use of said electric fields may lead to some fragmentation of (precursor) ions. Such fragmentation events can occur at any point in the mass spectrometer between the ion source and the mass analyser, such as in the ion transport devices which guide precursor ions into a fragmentation chamber and/or a mass analyser. This can introduce generally undesirable fragment ions into the sample of precursor ions being analysed which are not representative of the sample to be analysed. This decreases the dynamic range for the precursor ion spectra (MS1), as undesired fragment ions use analyser capacity that could be used for precursor ions. Furthermore, fragment ions consume valuable instrument time for their identification or confirmation by SIM, MS/MS and $MS^n$ experiments in the case of Data Dependent Analysis (DDA). In general, the presence of unintended fragment ions in MS1 spectra increases the complexity of the post-acquisition data processing and the interpretation of the aforementioned experiments.

One known methodology for discovering precursor ions is disclosed in U.S. Pat. No. 6,586,727 which discloses a method in which two MS2 mass spectra are obtained one with a collision cell operated in a high fragmentation mode, and the other with the collision cell operated in a low fragmentation mode. At least one candidate precursor ion may be identified by comparing ions having a certain mass to charge ratio in the high fragmentation mass spectrum with the intensity of ions having the same mass to charge ratio in the low fragmentation mass spectrum. If a high intensity peak is found in the low fragmentation spectrum but not in the high fragmentation spectrum then it is likely that the peak represents a precursor ion.

U.S. Pat. No. 6,717,130 discloses a method which repeatedly switches a collision cell between a substantially fragmentation mode and a substantially non-fragmentation mode. Precursor and fragment ions can be identified and associated based on their closeness of elution times.

The present invention seeks to improve methods of mass spectrometry which identify precursor ions. In particular, the present invention seeks to address problems associated with fragmentation introduced by ion-optics of a mass spectrometer.

SUMMARY OF THE DISCLOSURE

According to a first aspect of the invention a method of mass spectrometry is provided. The method comprises ionising a sample to produce a plurality of precursor ions, performing a first MS1 scan, and performing a second MS1 scan. Performing the first MS1scan comprises: transporting a first set of the precursor ions to a mass analyser using an ion transport device operated at a first setting, and mass analysing the first set of the precursor ions. Performing the second MS1 scan comprises transporting a second set of the precursor ions to a mass analyser using the ion transport device operated at a second setting, and mass analysing the second set of the precursor ions. The first setting and the second setting of the ion transport device are provided such that an energy imparted on the second set of precursor ions by the ion transport device is less than the energy imparted on the first set of precursor ions by the ion transport device. The method further comprises determining if a mass spectral peak in at least one of the first MS1 scan or the second MS1 scan is indicative of a precursor ion mass spectral peak based on intensities of mass spectral peaks of the first and second MS1 scans.

The present inventors have realised that the "standard" settings of one or more ion transport devices used for transporting ions to a mass analyser are typically optimised to improve or maximise the transmission of ions transported by said devices. One feature of such "standard" settings is that the ion's internal energy, accumulated in said ion transport devices can cause some particularly fragile ions (i.e. ions susceptible to fragmentation at relatively low energy) to fragment. For example, in some embodiments, the magnitude of the electrical fields in an ion transport device (i.e. electrical field settings) may be optimised to improve or maximise the transmission of ions transported by said device.

It will be appreciated that under 'standard' settings said ion transport devices are not configured to intentionally induce fragmentation of ions (since an MS1 scan is being performed), and rather that the fragmentation of ions is an undesirable side effect of the energy used to transport the ions. Thus, in some embodiments the ion transport device(s) do not include a fragmentation chamber, or the ion transport device(s) include a fragmentation chamber that is not configured to fragment ions during the MS1 scans. In some embodiments, the ion transport devices are upstream of a fragmentation chamber, i.e. between an ion source and a fragmentation chamber.

The present inventors have also realised that ion transport devices can be configured to transport ions such that a lower amount of energy is imparted on the ions in the second MS1 compared to the first scan. For example, the first MS1 scan may be performed under "standard" settings, while the second MS1 scan is performed using "soft" settings such that a lower amount of energy is imparted on the ions than "standard" settings.

So called "soft" settings for ion transport devices can reduce (or eliminate) the (undesirable) fragmentation of ions resulting from ion transport by ion transport devices by reducing the amount of energy used. One consequence of optimising the "soft" settings of the ion transport devices for reduced fragmentation is that the ion current (number of ions per time unit) of ions transported by said devices may be reduced. Such reduction can be compensated for by increasing the injection time taken to accumulate ions for mass analysis. However, if experiment cycle time is limited, then it is possible, that maximum allowed injection time will be reached before the same amount of ions are collected, as with standard settings. Thus, less ions can undergo following mass analysis at "soft" settings, than under standard settings. As such, the signal to noise ratio, for example, of mass spectra produced by an ion transport device operated under "soft" settings may not be as high as the signal to noise ratio for mass spectra produced with ion transport device operated under standard settings for a similar ion accumulation time. It is important to note that in neither of the first and second MS1 scans is the mass spectrometer (e.g. the ion transport devices) configured to maximise production of fragments, unlike for an MS2 scan.

As such, the present invention aims to improve the analysis of mass spectral peaks of an MS1 scans by performing two MS1 scans using different ion transport energies and determining if mass spectral peaks in the first and/or second MS1 scan are indicative of (unfragmented) precursor ion mass spectral peaks., The first and second MS1 scans may be performed over the same mass to charge ratio range (mass range). For example, the first and second MS1 scans may be full mass range MS1 scans.

The method of the present invention is provided to analyse a sample. It is understood that the sample may comprise a plurality of molecules. The sample molecules may be a mixture of molecules having a range of different molecular weights. The sample molecules may be ionised to produce a plurality of precursor ions. The precursor ions may have different ionisation states. Accordingly, the precursor ions may have different mass-to charge ratios (m/z).

In some embodiments of the invention, the first and second settings of the ion transport device may be provided by varying the electric fields of the ion transport device. As such, the first setting and the second setting of the ion transport device may be a first electric field setting and a second electric field setting. For example, in some embodiments, the ion transport device may include electrodes configured to provide an RF and/or a DC electric field for ion transport. A magnitude of the RF and/or D.C electric field may be varied between the first and second settings such that the amount of energy transferred to the ions is controlled in accordance with the first aspect. In particular, in some embodiments, the magnitude of the RF and/or D.C electric field for the first setting is larger than the magnitude of the RF and/or D.C electric field for the second setting.

In some embodiments of the invention, the first and second settings of the ion transport device may be provided by varying other settings as an alternative, or in addition to, the electric field of the ion transport device. For example, in some embodiments, an ion transport device may be configured to activate ions which it transports. The activation of ions transported by the ion transport device may increase the internal energy of the ions. Accordingly, the extent to which ions are activated by the ion transport may be varied between the first and second settings (i.e. first and second activations settings).

In some embodiments, an ion transport device may be configured to activate ions through the application of laser radiation, an electron beam, an ion beam, or a molecular beam.

For example, the laser radiation applied to ions transported through the ion transport device may be infra-red radiation, visible light radiation, or ultraviolet radiation. The application of laser radiation to ions in the ion transport device may increase the internal energy of the ions. Accordingly, under first settings of the ion transport device, laser radiation at a first intensity may be imparted on the ions in the ion transport device. Under second settings of the ion transport device, the intensity of the laser radiation may be reduced or removed entirely such that the internal energy of the ions transported by the ion transport device under the second settings is less than the internal energy of ions transported by the ion transport device under the first settings.

Similarly, the intensity of an electron beam, an ion beam, or a molecular beam may be varied between first and second settings (activation settings) such that the amount of energy imparted on ions transported by the ion transport device is controlled in accordance with the first aspect of the invention.

In accordance with the first aspect of the invention, MS1 scans of sets of precursor ions are performed. According to this disclosure, an MS1 scan is intended to refer to a scan of a set of ions (precursor ions) which have been produced by ionisation of a sample and transported to a mass analyser. As such, an MS1 scan aims to measure mass spectral peaks corresponding to unfragmented precursor ions. Accordingly, the MS1 scan assumes that the precursor ions are transported to the mass analyser without being subjected to an intentional fragmentation process. As discussed above, it will be understood that some (unintentional) fragmentation of the ions may nevertheless occur as a result of excessive internal energy, accumulated by the precursor ions as they travel through an ion transport device between the ion source and mass analyser. This ion transport induced fragmentation is generally undesirable and so the present invention attempts to reduce and/or eliminate the effects of this when analysing and/or identifying precursor ions in an MS1 mass spectrum.

According to the first aspect of the invention, the second MS1 scan is performed with the ion transport device using a operated under a second setting such that the energy imparted on the second set of precursor ions by the ion transport device is less than the energy imparted on the first set of precursor ions by the ion transport device. By using a lower energy for the second MS1 scan (e.g. a soft scan), the presence of ion transport induced fragmented ions in the second set of precursor ions may be reduced and/or eliminated relative to the first set of precursor ions. Generally, the second settings of the ion transport device in the second MS1 scan are configured for reduction and/or elimination of ion transport induced fragmented ions but this is at the expense of intensity of the mass spectral peaks (i.e. the second MS1 scan may be performed using a second setting of the ion transport device that is optimised to reduce and/or eliminate the intensity of the mass spectral peaks due to ion transport induced fragmented ions but not optimised to improve the intensity of the mass spectral peaks).

There are several possibilities for the mass spectral peaks present in the first and second MS1 scans resulting from the method of mass spectrometry according to the first aspect. As such, a given mass spectral peak may appear in only the first MS1 scan, only the second MS1 scan, or in both the first and second MS1 scans. For example, a mass spectral peak which appears in the first MS1 scan, but not in the second MS1 scan or which appears with significantly lower intensity in the second MS1 scan may be attributed to an ion produced by ion transport induced fragmentation. Conversely, a mass spectral peak which appears in the second MS1 scan, but not in the first MS1 scan or which appears with a similar or significantly higher intensity in the second MS1 scan may be attributed to a precursor ion. Accordingly, by comparing the peaks present in the first MS1 mass spectrum with the peaks present in the second MS1 mass spectrum it is possible to determine if mass spectral peaks present in the first MS1 scan mass spectrum are indicative of a precursor ion mass spectral peak. By indicative of a precursor ion mass spectral peak, the method according to this disclosure may determine that the mass spectral peak likely corresponds to that of an unfragmented precursor ion of the sample. As such, the mass spectral peak may not be the result of an ion transport induced fragment ion or the result of a cluster of ions having a similar mass to charge ratio.

In some embodiments the method according to the first aspect determines if mass spectral peaks in the first MS1 scan are indicative of precursor ions. The first MS1 scan is performed under first field settings such that a relatively higher amount of energy is imparted on the ions, and so transport induced fragments may be more likely to be present. For example, the first MS1 scan may be performed using a first setting of an ion transport device which is optimised to improve the intensity of the mass spectral peaks (i.e. using standard settings of the ion transport devices), i.e. as a result of higher ion transmission, but which result in the precursor ions having a relatively higher internal energy upon reaching the mass analyser. Accordingly, in some embodiments the precursor ion mass spectral peaks indicated in the first MS1 scan mass spectrum may have an improved signal to noise ratio and so may be more suitable for further analysis and/or identification of the precursor ion.

It is noted that the precursor ion mass spectral peaks determined according to the method of the first aspect do not rely on the generation of fragmented ions (i.e. an MS2 scan). For example, the determination of precursor ion mass spectral peaks does not rely on the generation of fragmented ions in a device configured to induce fragmentation of ions, such as a fragmentation chamber. That is to say the method may determine if a mass spectral peak corresponds to an (unfragmented) precursor ions without further MS2 analysis. Instead, only MS1 scans are used to determine if a mass spectral peak corresponds to a precursor ion.

In some embodiments, a mass spectral peak at a first mass to charge ratio in the first and/or second MS1 scan is determined to be a precursor ion mass spectral peak based on a first ratio of an intensity of the mass spectral peak in the second MS1 scan to an intensity of the mass spectral peak in the first MS1 scan. As such, the first (or second) MS1 scan may detect a mass spectral peak at a first mass to charge ratio. The intensity of the mass spectral peak is compared to the intensity of the corresponding mass spectral speak (i.e. having the same mass to charge ratio) in the other MS1 scan. Of course, for some samples the corresponding mass spectral peak in one of the scans may not be present (or indistinguishable from background noise), in which case the intensity of the peak may be recorded as the intensity of the background noise at the mass to charge ratio of the mass spectral peak being analysed.

For example, a first ratio may be a ratio of the extracted ion current measured by the mass analyser of a mass spectral peak of the second MS1 scan ($XIC_2$) at a first mass to charge ratio, to the extracted ion current measured by the mass analyser of the mass spectral peak at the first mass to charge in the first MS1 scan ($XIC_1$). Alternatively, a first ratio may be a ratio of the signal to noise ratio of a mass spectral peak at the first mass to charge ration in the second MS1 scan ($SN_2$) to a signal to noise ratio of the mass spectral peak at the first mass to charge ratio in the first MS1 scan ($SN_1$). The first ratio may be compared against a predetermined reference level in order to determine whether the mass spectral peak is indicative of a precursor ion mass spectral peak In some embodiments, a mass spectral peak having a first mass to charge ratio in the first and/or second MS1 scan is determined to be a precursor ion mass spectral peak based on the first ratio relative to a second ratio of an average intensity of the mass spectral peaks of the second MS1 scan to an average intensity of the mass spectral peaks of the first MS1 scan. Thus, the second ratio can be used as the reference level against which the first ratio may be compared.

An average intensity of the mass spectral peaks of the first MS1 scan and/or an average intensity of the mass spectral peaks of the second MS1 scan may be based on an average of the extracted ion current of the mass spectral peaks measured by the mass analyser for the respective scans, or an average of the signal to noise ratio of the mass spectral peaks for the respective scan. In some embodiments, each average intensity of the first and second MS1 scans may be determined from the average intensity over substantially the same range of mass to charge ratios for each scan. In one embodiment, a second ratio of average extracted ion currents may be calculated based on a ratio of a total ion current for the first MS1 scan to the total ion current for the second MS1 scan, the total ion currents summed over a corresponding mass to charge range. In another embodiment, a second ratio of average single to noise ratio may be calculated based on a ratio of a sum of the signal to noise ratio for each peak in the second MS1 scan to a sum of the signal to noise ratio for each peak in the first MS1 scan over a corresponding mass to charge range.

In some embodiments, a reference level may provide a criteria for determining if mass spectral peaks are indicative of precursor ion mass spectral peaks. The reference level may also provide a criteria for determining mass spectral peaks indicative of ion transport induced fragmentation and/or clusters of ions.

In some embodiments, a mass spectral peak in the first MS1 scan is determined to be a precursor ion mass spectral peak based on a third ratio of the first ratio to the second ratio relative to the reference level based on the first and second MS1 scans. It will be appreciated that some particularly fragile precursor ions may be fragmented even under a relatively low "soft" second setting (i.e. a second setting which causes a relatively low amount of energy to be imparted to the precursor ions by the ion transport device). As such, in some samples fragmented ions may be present in both the first and second sets of precursor ions. By comparing the change in peak intensity for the mass spectral peak to the average change in peak intensity for the two MS1 scans, the method of the first aspect may determine whether a mass spectral peak which appears in both the first and second MS1 scans is a precursor ion mass spectral peak or a result of ion transport induced fragmentation.

For example, a mass spectral peak of the first MS1 scan may be a result of ion transport induced fragmentation. In the second MS1 scan, performed such that the energy imparted on the second set of precursor ions is lower than the first set of precursor ions, the intensity of said mass spectral peak in the second MS1 scan may be reduced relative to the average drop in intensity across the whole spectrum. Accordingly, the method may determine that the mass spectral peak is a result of ion transport induced fragmentation. A reference level may be provided for setting a criteria for determining if mass spectral peaks in the first MS1 scan are a result of ion transport induced fragmentation.

In some embodiments, the reference level may be based on a fourth ratio of an injection time for the first MS1 scan to an injection time for the second MS1 scan. In particular, the reference level may be equal to the fourth ratio. As such, the expected average drop in peak intensity may be correlated to the change in injection time between the first and second MS1 scans. Accordingly, the reference level providing the criteria for detecting ion transport induced fragmentation may be based on a fourth ratio of the injection times for the first and second MS1 scans.

In some embodiments, the reference level may be adjusted according to the mass-to-charge ratio of the mass spectral peak to be identified. In some embodiments, the occurrence and/or detection of ion transport induced fragments may be mass-to-charge dependent. Thus, a third ratio for a mass spectral peak resulting from ion transport induced fragmentation may be influenced by the mass to charge ratio of the peak. Accordingly, a reference level providing a criteria for identifying ion transport induced fragmentation may also be mass-to-charge dependent.

For example, a mass spectrum for some samples may be mostly composed of ion transport induced fragments. Accordingly, a ratio of intensities (XIC, SN) against a reference level of the total (or average) ion induced currents (TIC) or a total (or average) signal to noise ratios ($SN_A$) may be less sensitive to the detection of fragmented ions as the quantity of fragmented ions may still be significantly present in the lower energy second MS1 scan. Thus, the reference level may be calibrated based on reference measurements of mass spectral peak intensity at first and second settings for the ion transport device. Accordingly, in some embodiments, the reference level may also provide a criteria for determining if a mass spectral peak is indicative of a precursor ion mass spectral peak based on the first ratio.

Accordingly, the method and systems of this disclosure may be calibrated to account for mass dependant variations in the transmission of ions through the ion transport devices of the mass spectrometer. It will be appreciated that, for some mass spectrometers, mass dependent transmission efficiency may affect the intensity with which fragment ions are identified. By calibrating the controller to account for transmission efficiency, the method may be improved to more accurately detect ion transport induced fragments and/or ion clusters.

In some embodiments, a mass spectral peak may be determined to be precursor ion mass spectral peak if the third ratio is at least X % of the reference level, where X is at least: 10%, 20%, 30%, 40%, 50% or 60%. For example, in one embodiment a mass spectral peak may be determined to be precursor ion mass spectral peak if the third ratio is at least 50% of the reference level. Accordingly, mass spectral peaks indicative of fragment ions may be excluded whilst mass spectral peaks indicative of (fragile) precursor ions may be identified.

In some experiments, a sample may comprise cluster ions. Cluster ions may be combinations of precursor ions joined by non-covalent forces which are often prevalent in MS1 scans performed under low energy conditions (soft scans). For example, cluster ions may be protonated solvents, or adducts. Accordingly, a mass spectral peak which has a significant increase in intensity between the first and second MS1 scans (relative to an average change in intensity may be determined to be indicative of a cluster of ions having a similar mass-to charge-ratio. So, in some embodiments, in order to distinguish between cluster ions and a mass spectral peak indicative of a precursor ion, an upper limit for the third ratio may be provided. For example, a mass spectral peak may also be determined to be a precursor ion mass spectral peak if the third ratio is no greater than: 500%, 400%, 300%, or 200% of the magnitude of the reference level. Of course, in experiments where cluster ions are not expected, or if a user chooses not to distinguish between mass spectral peaks indicative of precursor ions and mass spectral peaks indicative of cluster ions, the upper limit for the third ratio may not be used.

In some embodiments, the first mass analyser is used to perform the first and second MS1 scans. Accordingly, a single mass analyser may be used to determine precursor ion mass spectral peaks for further processing. The first mass analyser may be a Fourier transform mass analyser, for example, an orbital trapping mass analyser (such as an Orbitrap® mass analyser) or an ion cyclotron resonance (ICR) mass analyser. Alternatively, the first mass analyser may be a time of flight (ToF) mass analyser. Other types of mass analyser could be used, e.g. an RF ion trap (of 3D or linear type), quadrupole mass analyser or magnetic sector mass analyser. In some other embodiments, a first mass analyser may be used to perform the first MS1 scan and a second mass analyser may be used to perform the second MS1 scan. For example, a tandem mass analyser comprising two mass analysers may be used to perform the method of the first aspect. The first and second mass analysers may be of the same or different types.

The method of the first aspect may be applied in a variety of types of mass spectrometry.

According to a second aspect of the disclosure, a method of data dependent mass spectrometry is provided. The method comprises the method of mass spectrometry according to the first aspect of the disclosure, mass selecting a third set of precursor ions based on a mass-to-charge ratio corresponding to a determined precursor ion mass spectral peak and fragmenting the ions to produce a set of fragmented ions and performing an MS2 scan of the fragmented ions using a mass analyser.

According to the second aspect of the disclosure, a method of data dependent analysis (DDA) mass spectrometry may be provided. Advantageously, the MS1 data quality is improved as the occurrence of fragmented ions resulting from ion transport induced fragmentation in the precursor ions selected for DDA may be reduced. Accordingly, as selecting the precursor ions to be analysed by the method of DDA mass spectrometry according to the second aspect can better exclude unwanted peaks due to unintentionally fragmented ions it may reduce the complexity of post-processing and interpretation of the resulting data.

According to a third aspect of the disclosure, a method of data independent mass spectrometry may be provided. The method comprises a method of mass spectrometry according to the first aspect of the disclosure, and performing a plurality of data independent MS2 scans.

The method of data independent mass spectrometry may provide a data set for data independent analysis (DIA) which is easier to analyse as mass spectral peaks in the MS1 scans may be more easily characterised. For example, prior to analysing the MS2 data, mass spectral peaks indicative of precursor ions may be identified from the MS1 data alone.

According to a fourth aspect of the disclosure, a mass spectrometer for analysing a sample is provided. The mass spectrometer comprises an ionisation source, a mass analyser, an ion transport device, and a controller. The ionisation source configured to ionise a sample to produce a plurality of precursor ions. The ion transport device is configured to transport precursor ions from the ionisation source to the mass analyser. The controller is configured to perform a first MS1 scan by causing the ion transport device to transport a first set of the precursor ions to a mass analyser using a first setting, and to perform the first MS1 scan on the first set of precursor ions using the mass analyser. The controller is also configured to perform a second MS1 scan by causing the ion transport device to transport a second set of the precursor ions to a mass analyser using a second setting, and to perform the second MS1 scan on the second set of the precursor ions using the mass analyser. The second setting of the ion transport device is configured to impart a lower amount of energy on the second set of precursor ions than an amount of energy imparted by the first setting of the ion transport device on the first set of precursor ions. The controller is configured to determine if a mass spectral peak in at least one of the first MS1 scan or the second MS1 scan is indicative of a precursor ion mass spectral peak based on the mass spectral peaks of the first and second MS1 scans.

Accordingly, the mass spectrometer of the fourth aspect may be provided for implementing the methods of any of the first through third aspects of the disclosure.

BRIEF DESCRIPTION OF FIGURES

The invention will now be described in relation to the following non-limiting figures. Further advantages of the disclosure are apparent by reference to the detailed description when considered in conjunction with the figures in which.

DETAILED DESCRIPTION

Herein the term mass may be used to refer to the mass-to-charge ratio, m/z.

The term "internal energy" of a molecule, or ion, may be used to refer to the total energy contained within said molecule or molecular ion, but not including the kinetic energy of its motion, nor its potential energy due to external force fields. Thus, the internal energy of the molecule or molecular ion is intended to account for the gains and losses of energy of the molecule or molecular ion that are due to changes in its internal state.

Figure 1:
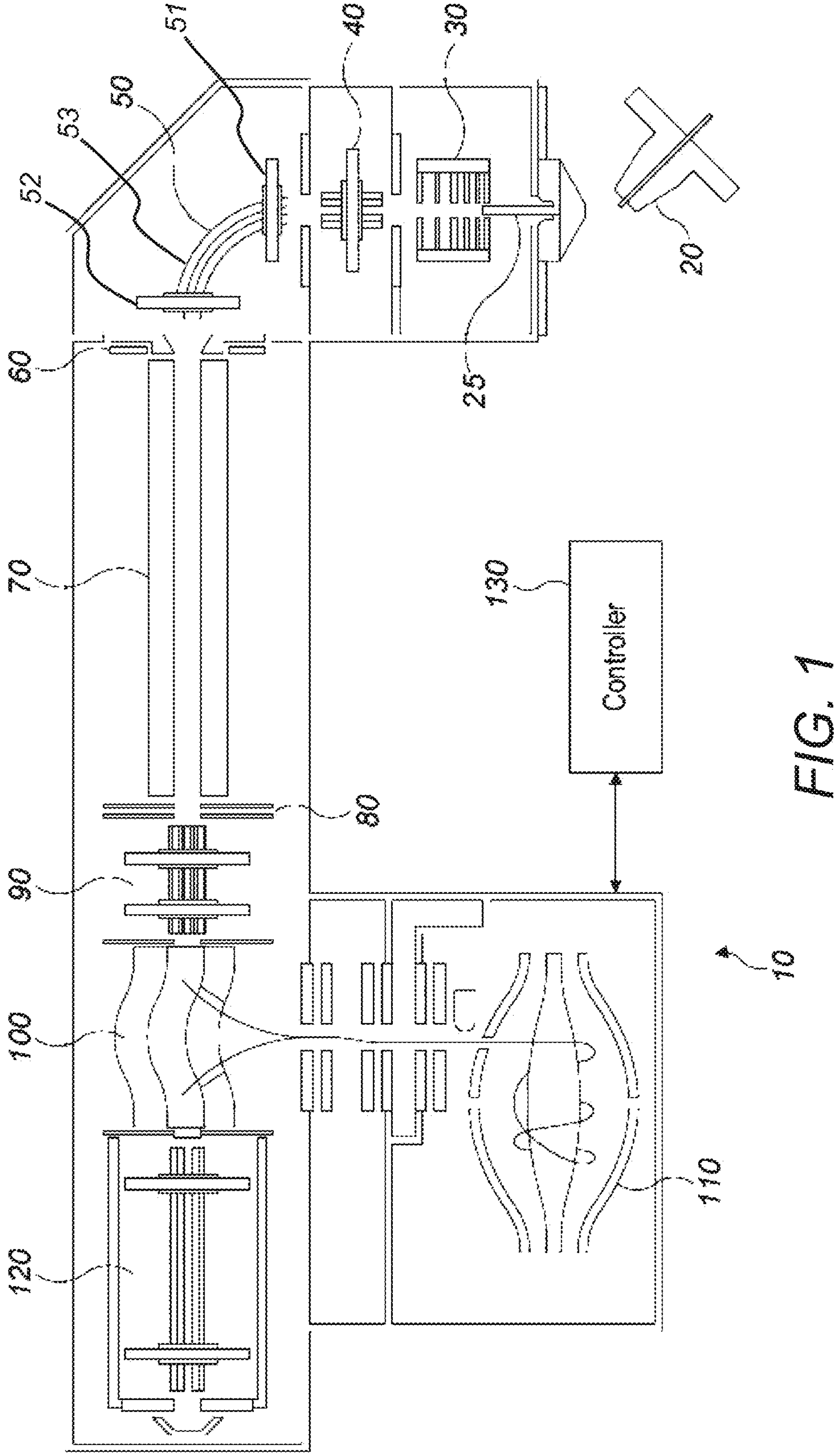
FIG. 1 shows a diagram of a mass spectrometer according to an embodiment of the disclosure.

FIG. 1 shows a schematic arrangement of a mass spectrometer 10 suitable for carrying out methods in accordance with embodiments of the present invention. The arrangement of FIG. 1 represents, schematically, the configuration of the Q-Exactive™ mass spectrometer from Thermo Fisher Scientific, Inc.

In FIG. 1, a sample to be analysed may be supplied (for example from an autosampler) to a chromatographic apparatus such as a liquid chromatography (LC) column (not shown in FIG. 1). One such example of an LC column is the Thermo Fisher Scientific, Inc ProSwift monolithic column which offers high performance liquid chromatography (HPLC) through the forcing of the sample carried in a mobile phase under high pressure through a stationary phase of irregularly or spherically shaped particles constituting the stationary phase. In the HPLC column, sample molecules elute at different rates according to their degree of interaction with the stationary phase.

The sample molecules thus separated via liquid chromatography are then ionized using an electrospray ionization source (ESI source) 20 which is at atmospheric pressure. The ESI source 20 generates precursor ions from the sample molecules. Precursor ions then enter a vacuum chamber of the mass spectrometer 10 and are directed by a capillary 25 into a Stacked Ring Ion Guide (SRIG) 30. The precursor ions are focused by the SRIG 30 into an injection flatapole 40 which injects the ions into a bent flatpole 50 with an axial field.

The bent flatapole 50 comprises an entrance portion 51, a bent guide portion 53 and an exit portion 52. The bent guide portion 53 provides a curved path from the entrance portion 51 through to the exit portion 53. The bent flatapole 50 guides (charged) ions along a curved path through it whilst unwanted neutral molecules such as entrained solvent molecules are not guided along the curved path and are lost.

An ion gate (TK lens) 60 is located at the distal end of the bent flatapole 50 and controls the passage of the ions from the bent flatapole 50 into a downstream quadrupole mass filter 70. The quadrupole mass filter 70 is typically but not necessarily segmented and serves as a band pass filter, allowing passage of a selected mass number or limited mass range whilst excluding ions of other mass to charge ratios (m/z). The quadrupole mass filter 70 may also allow passage of a wide mass range, e.g. for MS1 scans. In an alternative embodiment, other types of mass selector as known in the art could be used in place of the quadrupole mass filter.

Ions then pass through a quadrupole exit lens/split lens arrangement 80 and into a transfer multipole 90. The transfer multipole 90 guides the mass filtered ions from the quadrupole mass filter 70 into a curved linear ion trap (C-trap) 100. The C-trap 100 has longitudinally extending, curved electrodes which are supplied with RF voltages and end caps that to which DC voltages are supplied. The result is a potential well that extends along the curved longitudinal axis of the C-trap 100. In a first mode of operation, the DC end cap voltages are set on the C-trap so that ions arriving from the transfer multipole 90 are captured in the potential well of the C-trap 100, where they are cooled. The injection time (IT) of the ions into the C-trap determines the number of ions (ion population) that is subsequently ejected from the C-trap into the mass analyser.

Cooled ions reside in a cloud towards the bottom of the potential well and are then ejected orthogonally from the C-trap 100 towards an orbital trapping device 110 such as the Orbitrap® mass analyser sold by Thermo Fisher Scientific, Inc, wherein the ions are mass analysed. The orbital trapping device 110 has an off centre injection aperture and the ions are injected into the orbital trapping device 110 as coherent packets, through the off centre injection aperture. Ions are then trapped within the orbital trapping device 110 by a hyperlogarithmic electric field, and undergo back and forth motion in a longitudinal direction whilst orbiting around the inner electrode.

The axial (z) component of the movement of the ion packets in the orbital trapping device 110 is (more or less) defined as simple harmonic motion, with the angular frequency in the longitudinal direction being related to the square root of the mass to charge ratio of a given ion species. Thus, over time, ions separate in accordance with their mass to charge ratio.

Oscillating ions in the orbital trapping device 110 are detected by use of an image detector (not shown in FIG. 1) which produces a "transient" in the time domain containing information on all of the ion species as they pass the image detector. The transient is then subjected to a Fast Fourier Transform (FFT) resulting in a series of peaks in the frequency domain. From these peaks, a mass spectrum, representing abundance/ion intensity versus m/z, can be produced.

In the configuration described above, the precursor ions (more specifically, a set of the precursor ions within a mass range of interest, selected by the quadrupole mass filter) are analysed by the orbital trapping device 110 without fragmentation. The resulting mass spectrum is denoted MS1.

MS/MS (or, more generally, $MS^n$) can also be carried out by the mass spectrometer 10 of FIG. 1. To achieve this, precursor ions are generated and transported to the quadrupole mass filter 70 where a subsidiary mass or mass range is selected. The precursor ions that leave the quadrupole mass filter 70 are again cooled in the C trap 100 but are then ejected in an axial direction towards a fragmentation chamber or cell 120. Alternatively, in some embodiments precursor ions may travel from the quadrupole mass filter 70 through C trap 100 into the fragmentation chamber 120 without a cooling step. The fragmentation chamber 120 is, in the mass spectrometer 10 of FIG. 1, a higher energy collisional dissociation (HCD) device to which a collision gas is supplied. Precursor ions arriving into the fragmentation chamber 120 undergo high energy collisions with the gas molecules resulting in fragmentation of the precursor ions into fragment ions. The fragment ions are then ejected from the fragmentation chamber 120 back towards the C-trap 100, where they are once again trapped and cooled in the potential well. Finally the fragment ions trapped in the C-trap are ejected orthogonally towards the orbital trapping device 110 for analysis and detection. The resulting mass spectrum of the fragment ions is denoted MS2.

Although an HCD fragmentation chamber 120 is shown in FIG. 1, other fragmentation devices may be employed instead, employing such methods as collision induced dissociation (CID), electron capture dissociation (ECD), electron transfer dissociation (ETD), photodissociation, and so forth.

The "dead end" configuration of the fragmentation chamber 120 in FIG. 1, wherein precursor ions are ejected axially from the C-trap 100 in a first direction towards the fragmentation chamber 120, and the resulting fragment ions are returned back to the C-trap 100 in the opposite direction, is described in further detail in WO-A-2006/103412.

The mass spectrometer 10 is under the control of a controller 130 which, for example, is configured to control the timing of ejection of the trapping components, to set the appropriate potentials on the electrodes of the ion transport devices so as to focus and filter the ions, to capture the mass spectral data from the orbital trapping device 110, control the sequence of MS1 and MS2 scans and so forth. It will be appreciated that the controller may comprises a computer that may be operated according to a computer program comprising instructions to cause the mass spectrometer to execute the steps of the method according to the present invention.

It is to be understood that the specific arrangement of components shown in FIG. 1 is not essential to the methods subsequently described. Indeed other arrangements for carrying out the methods of identifying precursor ions of embodiments of the present invention are suitable. For example, the methods of this disclosure may also be implemented on a tandem mass spectrometer. In one embodiment, a tandem mass spectrometer may be provided for performing the first and/or second MS1 scans.

According to an embodiment of this disclosure, a method of mass spectrometry provided. The method may be performed by a mass spectrometer such as the mass spectrometer 10 described above and as shown in FIG. 1.

Firstly, the controller is configured to cause ESI source 20 to ionise the molecules of a sample supplied to it in order to produce a plurality of precursor ions. The sample may supplied by a liquid chromatography system as discussed above.

The controller is configured to cause the mass spectrometer to perform a first MS1 scan and a second MS1 scan. It will be appreciated that the present invention is not limited to performing the first and second MS1 scans in a specific order. As such, the first and second MS1 scans may be performed in any order. In some embodiments, the first and second MS1 scans are performed over substantially the same mass to charge ratios. For example, in one embodiment, each MS1 scan may be performed over a mass to charge ratio of m/z=300 to m/z=1500.

The first MS1 scan may be performed using a first set of the plurality of precursor ions (a first set of precursor ions). Performing the first MS1 scan comprises transporting the first set of precursor ions from the ESI source 20 of the mass spectrometer 10 to the orbital trapping device 110 using the mass spectrometer 10 described above. The controller is configured to control the ion transport devices by setting appropriate potentials to transport the first set of precursor ions to the orbital trapping device 110.

As such, the first set of ions may be transported through capillary 25, SRIG 30, injection flatapole 40, bent flatpole 50, ion gate (TK lens) 60, quadrupole mass filter 70, quadrupole exit lens/split lens arrangement 80, transfer multipole 90, and C-trap 100 into the orbital trapping device 110. As such, the first set of precursor ions may be transported from the ionisation source (ESI source 20) through to a mass analyser via a plurality of ion transport devices. In general, the present disclosure may be applied to mass spectrometers having one or more ion transport devices.

The orbital trapping device 110 may be used to mass analyse the first set of ions in order to obtain a first MS1 scan. The orbital trapping device 110 may be configured to perform the first MS1 scan at a resolution of at least 15,000. More preferably, the orbital trapping device may perform the first MS1 scan at a resolution of at least: 50,000, 75,000 or 100,000.

The controller is also configured to cause the mass spectrometer to perform the second MS1 scan. The second MS1 scan may be performed using a second set of the plurality of precursor ions (a second set of precursor ions). Performing the second MS1 scan comprises transporting the second set of precursor ions from the ESI source 20 of the mass spectrometer 10 to the orbital trapping device 110. The second set of ions may be transported to the orbital trapping device by the same ion transport devices as used for the first MS1 scan.

The orbital trapping device 110 may be used to mass analyse the second set of ions in order to obtain a second MS1 scan. The orbital trapping device 110 may be configured to perform the second MS1 scan at a resolution of at least 15,000. More preferably, the orbital trapping device may perform the second MS1 scan at a resolution of at least: 50,000, 75,000 or 100,000.

In transporting the ions to the mass analyser 110 for performing the MS1 scans, as described above it should be noted that the precursor ions do not enter the fragmentation cell 120. Alternatively, in transporting the ions to the mass analyser 110 for performing the MS1 scans, the ions could enter the fragmentation cell 120 and then return to the C-Trap but under settings (e.g. pressure and/or collision energy) in which the fragmentation cell 120 does not cause fragmentation.

In order to transport the first and second sets of precursor ions through the plurality of ion transport devices to the mass analyser, energy is supplied to the ion transport devices in order to confine and guide the precursor ions. Typically, the ion transport devices confine and guide the precursor ions using electrical fields applied to the ion transport devices. The electric fields may be DC, RF or a combination of DC and RF fields depending on the nature of the device. The controller may be configured to control a potential, a current or a power supplied to the ion transport devices in order to control the electric fields. By controlling the electric fields of the ion transport devices, the controller may control the amount of energy imparted on the precursor ions by the ion transport devices as a set of precursor ions is transported from the ESI source 20 to the orbital trapping device 110. The electric fields applied to the ion transport devices of the mass spectrometer 10 for the first MS1 scan may be a first electric field setting (first setting), and the electric fields applied to the ion transport devices for the second MS1 scan may be a second electric field setting (second setting).

It will be appreciated that one important difference between the first and second electric field settings is the amount of energy imparted on the precursor ions as they are transported to the mass spectrometer by the ion transport device(s). In many ion transport devices, RF and/or D.C electric fields are used to transport ions. Where D.C electric fields are used to transport ions, the amount of energy imparted on the precursor ions by the ion transport devices may depend on the D.C potential difference across one or more ion transport devices. The amount of energy imparted on the precursor ions can also depend on the amplitude of RF voltage applied to transport ions (e.g. in ion guides). As such, a second electric field setting may provide one or more RF and/or D.C electric field settings for ion transport devices such that, for example, the potential difference experienced by the second set of precursor ions is less than the potential difference for the first electric field settings.

For example. in one embodiment, the RF and DC voltages applied to the mass spectrometer by the controller 130 under the first electric field settings may be as follows. The ESI source 20 may have a D.C voltage of 3.5 kV applied to it. The capillary 25 may have a DC voltage of 25 V. The SRIG 30 may have a DC voltage of 25 V and an RF voltage of 100 Vpp (RF voltage amplitude measured peak to peak), Injection Flatapole 40 may have 8 V DC offset and 200 Vpp RF voltage, Bent Flatapole 50 may have 300 Vpp RF voltage and a DC offset voltage of 6 V. A DC electric field gradient may be applied across the Bent Flatapole 50 from the entrance portion 51 to the exit portion 52, wherein a potential difference of 30 V is applied across the guide portion 53. The ion gate (TK lens) 60 at the entrance to the quadrupole mass filter 70 may have a DC voltage of −10 V applied to it. Quadrupole mass filter 70 may have a 5 V DC offset and 300 Vpp RF voltage applied to it. The quadrupole exit lens 80 may have a DC voltage of −35 V. Transfer Multipole 90 may have −3 V DC offset and about 1000 Vpp RF voltage applied to it. The C-trap 100 may have a DC offset voltage of 5 V on an entrance lens, a DC offset voltage of 0 V in the middle of the C-trap 100, and a DC offset voltage of 10 V applied to an exit lens. The C-trap 100 may have an RF voltage of 2000 Vpp applied to it.

In one embodiment of the disclosure, the DC fields applied to the ESI source 20, capillary 25, and SRIG 30 may be varied between the first and second MS1 scans. For the first electric field setting (first MS1 scan), a DC field of 25 V may be applied to the capillary 25 and SRIG 30. For the second electric field setting, a DC field of 15 V may be applied to the capillary 25 and SRIG 30. The RF field applied to the SRIG 30 may also be varied. For the first electric field setting, the peak to peak voltage ($V_{pp}$) may be 100 $V_{pp}$. For the second electric field setting, the RF field applied may be 0 $V_{pp}$. As such, it will be appreciated that the second electric field setting will impart a lower amount of energy to the ions as they are transported to the mass analyser than the first electric field setting (i.e. the second electric field setting is termed a softer setting).

The DC field applied to the bent flatapole 50 may also be varied. For example, in one embodiment, the DC voltage for providing the gradient may be 30 V for the first electric field setting and 15 V for the second electric field setting. The electric field applied to the C-trap 100 may also be varied. For example, in one embodiment, the DC offset applied to the C-trap for the first electric field setting may be 0 V, while for the second electric field setting the DC offset applied to the C-trap 100 may be 3 V. Accordingly, the DC electric field offset difference (i.e. a potential difference) between the bent flatapole 50 and the C-trap 100 may be reduced under the second electric field settings compared to the first electric field settings. The RF field applied to the C-trap 100 for the first electric field setting may be 2000 $V_{pp}$ while the RF field applied for the second electric field setting may be 1500 $V_{pp}$.

Other DC and RF fields provided by ion transport devices in the mass spectrometer 10 may be held constant for the first and second MS1 scans. Alternatively, settings for further ion transport devices of the mass spectrometer 10 may also be varied in a similar manner to those described above in order to provide first and second electric field settings, wherein the amount of ion transport induced fragmentation is reduced in the second electric field setting relative to the first electric field setting. As such, the energy imparted on the second set of ions during transport to the mass analyser under the second electric field settings is less than the energy imparted on the first set of ions during transport to the mass analyser under the first electric field settings. Consequently, an increase in the internal energy of the second set of ions may be reduced relative to the increase in the internal energy of the first set of ions, thereby reducing the likelihood of ion transport induced fragmentation occurring in the second set of ions.

The controller (e.g. a computer processor) may then analyse the mass spectra of the first and second MS1 scans. The controller may use isotope envelope detection to identify mass spectral peaks. The controller may search for mass spectral peaks in the first MS1 scan and search the second MS1 scan for a corresponding mass spectral peak at the same mass to charge ratio with predetermined accuracy. Typically, accuracy for an OrbiTrap mass analyser is about ±5 ppm. The accuracy can be specified depending on experimental setting from around ±1 ppm or up to around ±50 ppm. If the controller determines that a corresponding peak is not present in the second MS1 scan, the controller may determine that the mass spectral peak in the first MS1 scan is indicative of a fragment ion. If a mass spectral peak in the first MS1 scan corresponds to a peak in the second MS1 scan, the controller may determine that the mass spectral peak in the first MS1 scan is indicative of a precursor ion mass spectral peak.

For some samples to be analysed, ion transport induced fragments may be present in both the first MS1 scan and the second MS1 scan. A method according to an embodiment of this disclosure may further distinguish between precursor ion mass spectral peaks and ion transport induced fragment peaks in such a scenario by taking into account an average variation in the signal intensity between the first and second MS1 scans.

Accordingly, in some embodiments of the disclosure the controller may determine a mass spectral peak of the first MS1 scan is indicative of a precursor ion mass spectral peak based on a first ratio of the intensity of the mass spectral peak in the second MS1 scan ($P_2$) to the intensity of the mass spectral peak in the first MS1 scan ($P_1$), relative to a second ratio of an average intensity of the second MS1 scan ($A_2$) to an average intensity of the first MS1 scan ($A_1$). As such, the relative magnitude of the fraction $P_2/P_1$ may be compared to the relative magnitude of the fraction $A_2/A_1$.

For example, in some embodiments a controller may determine that when the first ratio ($P_2/P_1$) is substantially lower than the second ratio (i.e. $P_2/P_1 \ll A_2/A_1$) the mass spectral peak of the first MS1 scan is indicative of an ion transport induced fragment ion. The controller may determine that when the first ratio ($P_2/P_1$) is generally similar to the second ratio (i.e. $P_2/P_1 \sim A_2/A_1$) the mass spectral peak of the first MS1 scan is indicative of a precursor ion. In some embodiments, the first ratio being substantially lower than the second ratio may be when the first ratio is no more than: 50%, 40%, 30%, 20%, or 10% of the second ratio. In other embodiments, the first ratio may be determined to be substantially lower than the second ratio based on a reference level, as described further below.

Figure 2:
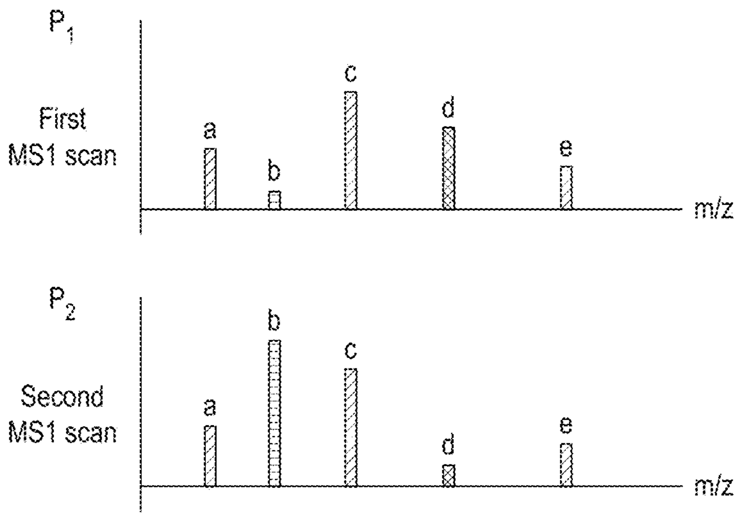
FIG. 2 shows a graphical representation of a first and second MS1 scan which may be obtained by methods in accordance with this disclosure.

FIG. 2 shows a graphical representation of a first and second MS1 scan which may be obtained by methods in accordance with this disclosure. As described above, the second MS1 scan is performed using a lower energy for the ion transport devices than the first MS1 scan. Each graph shows the intensity ($P_1$, $P_2$) of a plurality of mass spectral peaks plotted against a mass to charge ratio (m/z) of the corresponding peak. Corresponding peaks have a similar m/z in each graph are labelled with like letters (a, b, c, d, e).

As shown in FIG. 2, the intensities of peaks a, c, and e are generally unchanged between the first and second MS1 scan. As such, a first ratio ($P_2/P_1$) for each of peaks a, c, and e is generally similar to the second ratio (i.e. $P_2/P_1 \sim A_2/A_1$) for the two MS1 scans. Thus, it can be determined that peaks a, c, and e are indicative of precursor ion mass spectral peaks.

The intensity of Peak d in FIG. 2 is substantially higher in the first MS1 scan than in the second MS1 scan. As such, a first ratio ($P_2/P_1$) for peak d is substantially smaller than the second ratio (i.e. $P_2/P_1 \ll A_2/A_1$). Thus, it can be determined that this peak is not representative of a precursor ion mass spectral peak. Effectively, peak d is indicative of ion transport induced fragmentation. By reducing the energy imparted on the ions during ion transport in the second MS1 scan, the ion transport induced fragmentation in the second MS1 scan and so the relative intensity of this peak in the second MS1 scan is reduced.

The intensity of peak b in FIG. 2 is substantially higher in the second MS1 scan than in the first MS1 scan. As such, a first ratio ($P_2/P_1$) for peak b is substantially higher than the second ratio (i.e. $P_2/P_1 \gg A_2/A_1$). For mass spectra peaks with a first ratio substantially higher than the second ratio, the mass spectral peak may be representative of a precursor ion which is particularly fragile (i.e. the precursor ion is susceptible to fragmentation under the ion transport energy used for the first scan).

Various parameters measured by the mass spectrometer 10 may be representative of an intensity of a mass spectral peak. In some embodiments, peak intensity of a mass spectral peak may be represented by an extracted ion current (XIC) measure by the mass analyser (orbital trapping device 110). As such, the first ratio may be a ratio of the extracted ion current ($XIC_2$) of the second MS1 scan to the extracted ion current measured by the mass analyser of the first MS1 scan ($XIC_1$). In other embodiments, peak intensity of a mass spectral peak may be represented by a signal to noise ratio of a peak. Accordingly, a first ratio may be a ratio of the signal to noise ratio of a peak of the second MS1 scan ($SN_2$) to a signal to noise ratio of a peak of the first MS1 scan ($SN_1$).

Various parameters measured by the mass spectrometer 10 may also be used as average intensities. In some embodiments, each average intensity of the first and second MS1 scans may be determined from the average intensity over substantially the same range of mass to charge ratios for each scan. In some embodiments, an average peak intensity may be the average extracted ion current ($XIC_A$) for the mass spectrum. The average extracted ion current may be calculated as the total extracted ion current during the scan divided by the mass range of the scan (or as sum of the ion current measurements divided by the number of ion current measurements across the mass range of the scan). As such, the second ratio may be a ratio of the average extracted ion current ($XIC_{A2}$) of the second MS1 scan to the average extracted ion current measured by the mass analyser of the first MS1 scan ($XIC_{A1}$). Alternatively, a second ratio may be a ratio of the average signal to noise ratio of the second MS1 scan ($SN_{A2}$) to an average signal to noise ratio of the first MS1 scan ($SN_{A1}$).

Accordingly, the mass spectrometer 10 may use the following criteria for determining whether a mass spectral peak in the first MS1 scan is indicative of a fragment ion:

$$XIC_2/XIC_1 \ll XIC_{A2}/XIC_{A1}; \text{ or}$$

$$SN_2/SN_1 \ll SN_{A2}/SN_{A1}.$$

The average intensity of the first and second MS1 scans in some embodiments may be represented by the total intensity over substantially the same range of mass to charge ratios for each scan. The total intensity may be the total ion current (TIC) for the mass spectrum. As such, the second ratio may be a ratio of the total ion current ($TIC_2$) measured by the mass analyser of the second MS1 scan to the total ion current of the first MS1 scan ($TIC_1$). Alternatively, a second ratio may be a ratio of the total signal to noise ratio of the second MS1 scan ($allSN_2$) to a total signal to noise ratio of the first MS1 scan ($allSN_1$).

Accordingly, the mass spectrometer 10 may use the following criteria for determining whether a mass spectral peak in the first MS1 scan is indicative of a fragment ion:

$$XIC_2/XIC_1 \ll TIC_2/TIC_1; \text{ or}$$

$$SN_2/SN_1 \ll allSN_2/allSN_1.$$

The criteria for determining whether a mass spectral peak in the first MS1 scan is indicative of a fragment ion may be a fixed relationship between the first and second ratios. Effectively, this relationship may be realised as a third ratio of the first ratio to the second ratio. Accordingly, the mass spectrometer may use the following criteria for determining whether a mass spectral peak in the first MS1 scan is indicative of a fragment ion:

$$(XIC_2/XIC_1)/(XIC_{A2}/XIC_{A1}) \ll 1; \text{ or}$$

$$(SN_2/SN_1)/(SN_{A2}/SN_{A1}) \ll 1 \text{ or}$$

$$(XIC_2/XIC_1)/(TIC_2/TIC_1) \ll 1; \text{ or}$$

$$(SN_2/SN_1)/(allSN_2/allSN_1) \ll 1.$$

The identification of fragment ion peaks means that they can be excluded from the first and/or second MS1 spectrum, especially for subsequently processing, such as by DDA and DIA processing. Thus the MS1 data quality is improved.

In one embodiment, a reference level may be used as the criteria for determining whether a mass spectral peak in the first MS1 scan is indicative of a fragment ion. As such, if the third ratio is within a certain range defined by the reference level, the mass spectral peak in the MS1 scan is determined to be a precursor ion mass spectral peak. For example, if the third ratio of a mass spectral peak is determined to be at least 50% of the reference level, the mass spectral peak may be determined to be precursor ion mass spectral peak. Accordingly, a mass spectral peak which has a significant drop in intensity between the first and second MS1 scans (relative to an average change in intensity) may be determined to be a peak indicative of an ion transport induced fragment. For example, if the third ratio is determined to be lower than 50% of the reference level, the mass spectral peak may be determined to be indicative of a fragment ion. Of course, the reference level could be set to any suitable level depending on how confident one wishes to be that a peak is due to a fragment ion. For example, in some embodiments the reference level may be at least: 0.01, 0.05, 0.1, 0.2, 0.3, 0.4, or 0.5. In some embodiments the reference level may be no greater than: 0.6, 0.8, 1.0, 1.2, 1.5, 1.8 or 2.

Furthermore, embodiments of this disclosure may also incorporate an upper limit to the criteria. For example, if the third ratio of a mass spectral peak is determined to be no greater than 2 times the reference level, the mass spectral peak may be determined to be precursor ion mass spectral peak. Accordingly, a mass spectral peak which has a significant increase in intensity between the first and second MS1 scans (relative to an average change in intensity may be determined to be indicative of a cluster of ions having a similar mass-to-charge-ratio. Information that the peak may be representative of cluster ions may be useful for simplifying further analysis performed by the mass spectrometer. Cluster ions may be combinations of precursor ions joined by non-covalent forces which are often prevalent in MS1 scans performed under low energy conditions (soft scans). For example, cluster ions may be protonated solvents, or adducts.

In one embodiment, the reference level may be based on a fourth ratio of an injection time for the first MS1 scan to an injection time for the second MS1 scan. For the method implemented on the mass spectrometer 10 of this disclosure, an injection time for an MS1 scan may be the time taken to inject precursor ions into the C-trap 100. It will be appreciated that the injection time determines the number of ions (ion population) that is subsequently ejected from the C-trap 100 into the mass analyser. Furthermore, the variation in the electric field settings of the ion transport devices may cause the C-trap 100 to fill slower under the second electric field settings relative to the first electric field settings. As such, in the mass spectrometer 10 of this disclosure, the injection time for the first and second MS1 scans may be varied such that about the same number of ions are injected into the C-trap 100. The injection time for the first and second MS1 scans may be controlled using an automatic gain control mechanism, for example as described in U.S. Pat. No. 6,987,216.

In other embodiments implemented on different mass spectrometer systems, the injection time may be indicative of the number of ions and/or the time taken to inject ions into the mass analyser. As will be understood by the skilled person, the time taken to inject ions into the mass analyser may influence the intensity of the mass spectral peak (i.e. signal to noise ratio) as a greater number of ions may be injected into the mass analyser as the injection time is increased. As such, the fourth ratio of the injection times for the first and second MS1 scans may provide an indication of the relative signal levels which would be expected to be measured in each of the first and second MS1 scans.

The reference level may be determined to be equal to the fourth ratio. As such, if the third ratio is within a certain range defined by the fourth ratio, the mass spectral peak in the MS1 scan is determined to be a precursor ion mass spectral peak. For example, if the third ratio of a mass spectral peak is determined to be at least 50% of the fourth ratio, the mass spectral peak may be determined to be precursor ion mass spectral peak. In other embodiments, the criteria for determining the mass spectral peak is indicative of a precursor ion mass spectral peak may be that the third ratio is at least X % of the fourth ratio, where X is: 10%, 20%, 30%, 40% 50%, or 60%.

For example, for the mass spectrometer 10 of this disclosure, an injection time for the first MS1 scan may be 1 ms, and an injection time for the second MS1 scan may be 10 ms. Thus, a fourth ratio may about 0.1. The fourth ratio may be utilised in embodiments of the invention where the injection time to inject a predetermined number of ions into the C-trap 100 for the first and second MS1 scans falls within the allowable range of injection times for the mass spectrometer 10.

So, in one embodiment where the reference level given by the fourth ratio of injection times is 0.1, a mass spectral peak may be determined to be indicative of a precursor ion mass spectral peak if the third ratio is within the range:

$0.05 \leq \text{third ratio} \leq 0.2$

Figure 3:
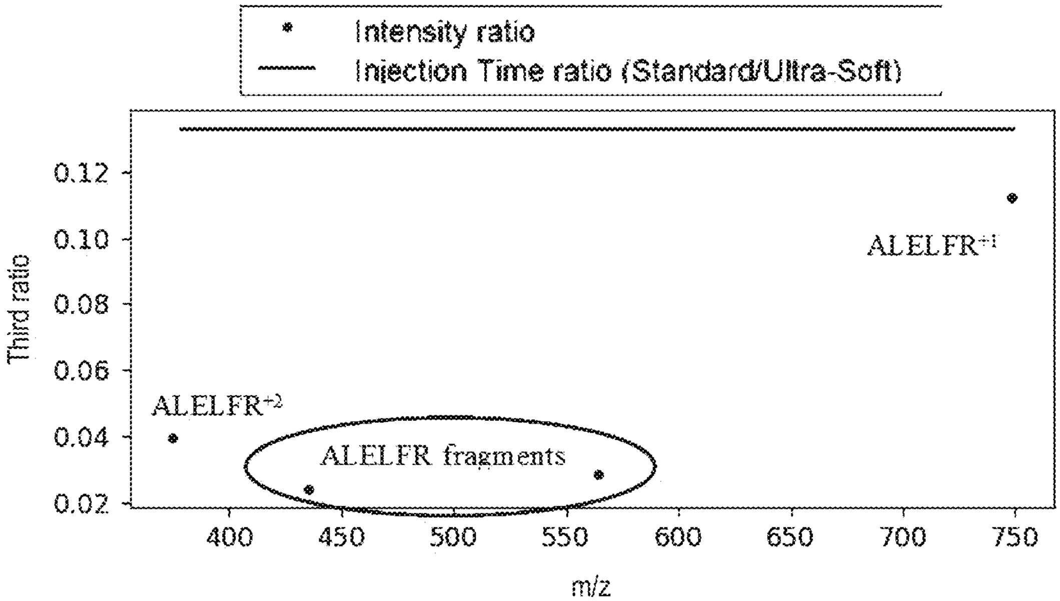
FIG. 3 shows a graph of third ratios determined from first and second MS1 scans for an ALELFR sample.

In one example, a known sample of a tryptic peptide (ALELFR) is analysed by the mass spectrometer 10 of this disclosure. This particular sample is particularly sensitive to ion transport induced fragmentation. The sample is ionised by the ESI source 20 and two MS1 scans are obtained of the precursor ions. The injection time for the first MS1 scan was 3.2 ms, and the injection time for the second MS1 scan was 24 ms. Thus, the first and second MS1 scans are performed with an injection time ratio (fourth ratio) of 0.133. The mass spectra obtained from the two MS1 scans are analysed and a graphical representation of the analysis is shown in FIG. 3. FIG. 3 shows is a plot of third ratios (e.g. $(XIC_2/XIC_1)/(XIC_{A2}/XIC_{A1})$) calculated for the mass spectral peaks measured by the two MS1 scans.

The third ratios are plotted against the corresponding mass to charge ratio of the mass spectral peak. For reference, a line representing the injection time ratio (fourth ratio) is also plotted. As described above, in this example the criteria for determining if a mass spectral peak is indicative of a precursor ion mass spectral peak is if the third ratio of a mass spectral peak is determined to be at least 50% of the fourth ratio. Accordingly, mass spectral peaks at about m/z 435.272 and m/z 564.315 may be determined to be the result of ion transport induced fragmentation. These peaks are known to correspond to fragments of the ALELFR precursor ion. The mass spectral peak m/z=748.436 may be identified as corresponding to a precursor ion mass spectral peak as the third ratio is substantially similar to the fourth ratio. Peaks at these mass to charge ratios are known to correspond to mass to charge ratios of different ionisation states of the known ALELFR precursor.

The mass spectral peak present at m/z=374.722 in FIG. 3 may be nominally classified as a being indicative of ion transport induced fragmentation, as the peak intensity is less than 50% of the fourth ratio. However, the mass spectral peak corresponds to a multiply charged peak (doubly charge in this case) of the precursor ion ALELFR. For some particularly fragile precursor ions, such as ALELFR, it is observed multiply charged precursor ions states are not a stable as the singly charged state when analysed under relatively low electric field settings (i.e. second electric field settings). This may result in mass spectral peaks associated with multiply charged precursor ions being incorrectly identified as being indicative of ion transport induced fragmentation. To try to correct for such identifications, the controller may also check to see if any mass spectral peaks identified as being indicative of an ion transport induced fragment can be associated with a mass spectral peak identified as being indicative of a singly charged precursor ion. In the embodiment of FIG. 3, the mass spectral peak at m/z=374.722 can be associated with the mass spectral peak m/z=748.436, which is determined to be indicative of a precursor ion ($ALELFR^{1+}$). Thus, the controller may determine that the mass spectral peak at m/z=374.722 is indicative of a precursor ion ($ALELFR^{2+}$) through a further check.

Figure 4:
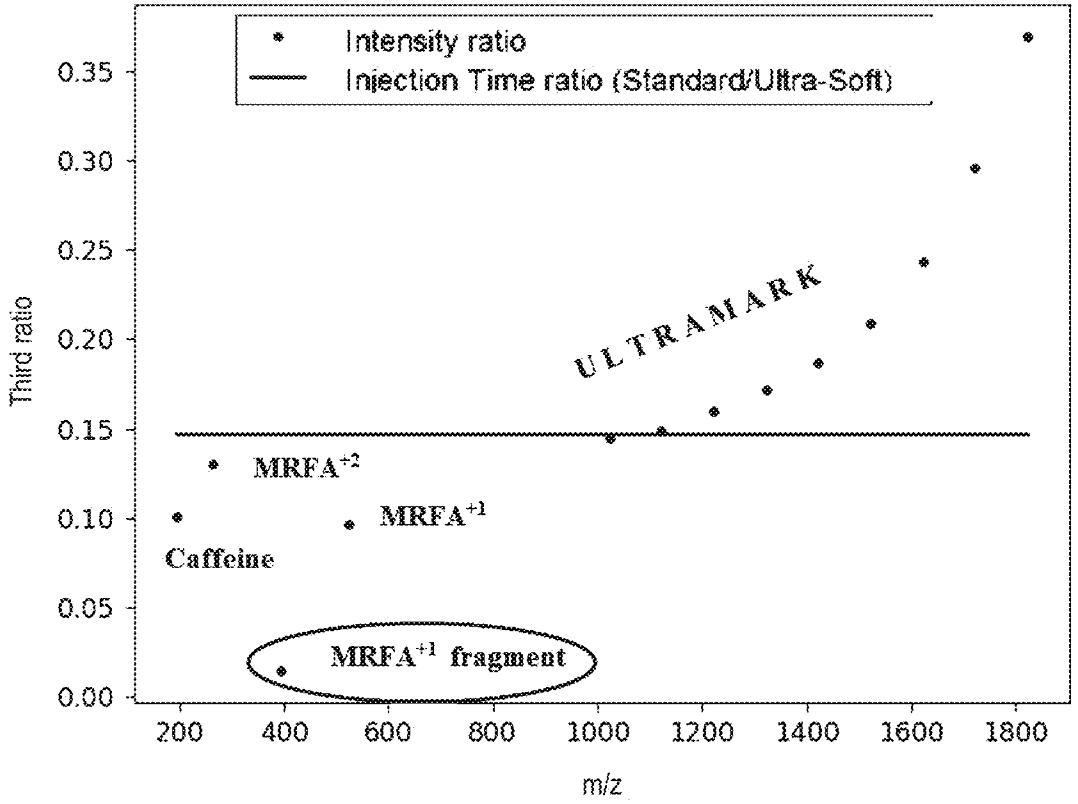
FIG. 4 shows a graph of third ratios determined from first and second MS1 scans for a Calmix infusion sample.

In a second example, a sample of Calmix infusion solution is analysed by the mass spectrometer 10 of this disclosure. The Calmix sample comprises: 0.0005% n-butylamine, 2 ug/mL caffeine Solution, 1 ug/mL MRFA (peptide), 0.001% UltraMark 1621, 50% acetonitrile, 25% methanol and 1% acetic acid. The sample is ionised by the ESI source 20 and two MS1 scans are obtained of the precursor ions. The injection time for the first MS1 scan was 0.94 ms, and the injection time for the second MS1 scan was 6.4 ms. Thus, the first and second MS1 scans are performed with an injection time ratio (fourth ratio) of about 0.147. The mass spectra obtained from the two MS1 scans are analysed and a graphical representation of the analysis is shown in FIG. 4. FIG. 4 shows is a plot of third ratios $((XIC_2/XIC_1)/(XIC_{A2}/XIC_{A1}))$ calculated for the mass spectral peaks measured by the two MS1 scans. The third ratios are plotted against the corresponding mass to charge ratio of the mass spectral peak. For reference, a line representing the injection time ratio (fourth ratio) is also plotted. As described above, in this example the criteria for determining if a mass spectral peak is indicative of a precursor ion mass spectral peak is if the third ratio of a mass spectral peak is determined to be at least 50% of the fourth ratio. Accordingly, an MRFA fragment is identified at a mass to charge ratio of m/z 393.224, and a mass spectral peak at m/z 524.265 is determined to be a precursor ion mass spectral peak.

Figure 5:
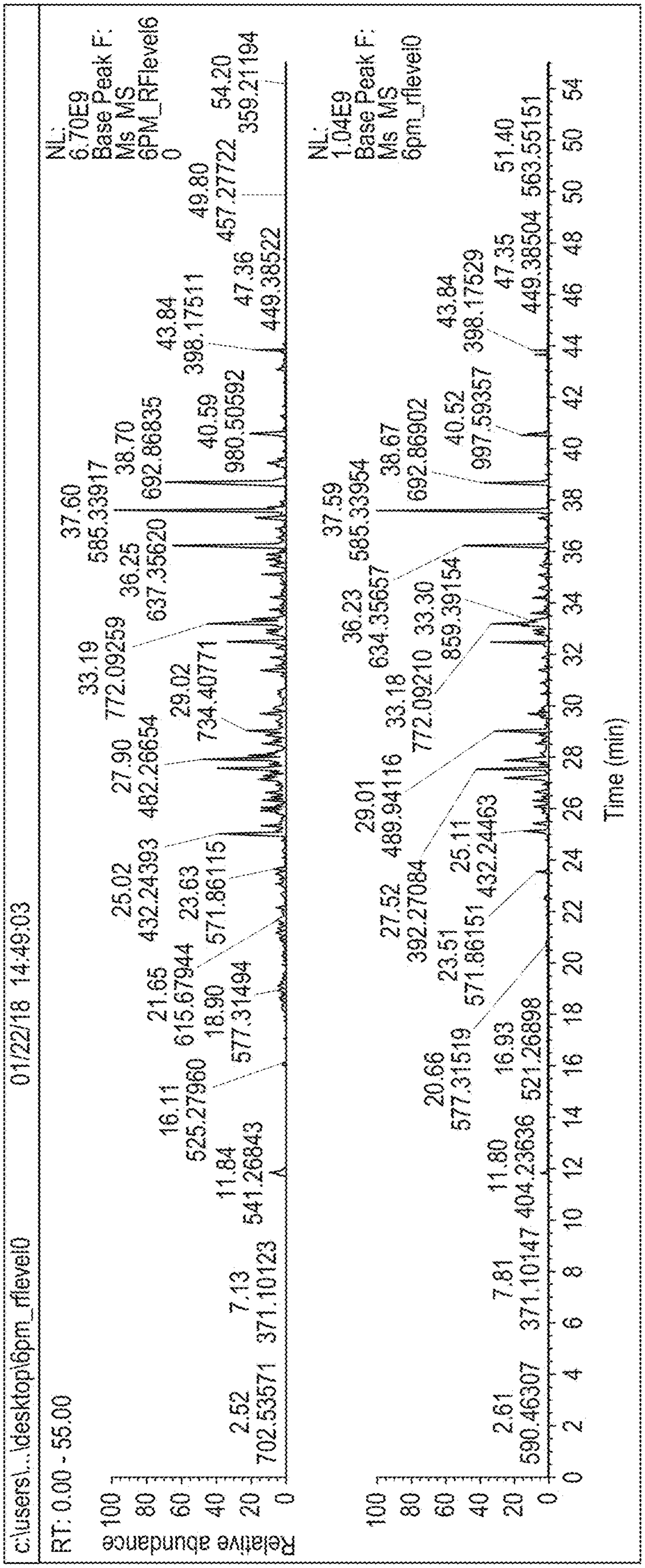
FIG. 5 shows a graphical representation of a time series of chromatographic peaks produced by liquid chromatography of a sample comprising a six protein mix digest in pure solvents.

FIG. 5 shows a time series of chromatographic peaks produced by liquid chromatography of a six protein mix digest in pure solvents (no complex matrix). The chromatographic peaks have been analysed by a mass analyser performing two independent MS1 scans under "standard" (a first MS1 scan) and "soft" (a second MS1 scan) ion transport electric field settings. The mass to charge ratio for each chromatographic peak is indicated on the time series. As such, FIG. 5 is representative of raw data which may be generated by MS1 scans. It can be seen that the relative intensities of at least some peaks change between the first and second MS1 scans, whilst other peaks remain largely unchanged, allowing identification of peaks due to precursors and peaks due to fragments according to the method of the invention.

Figure 6:
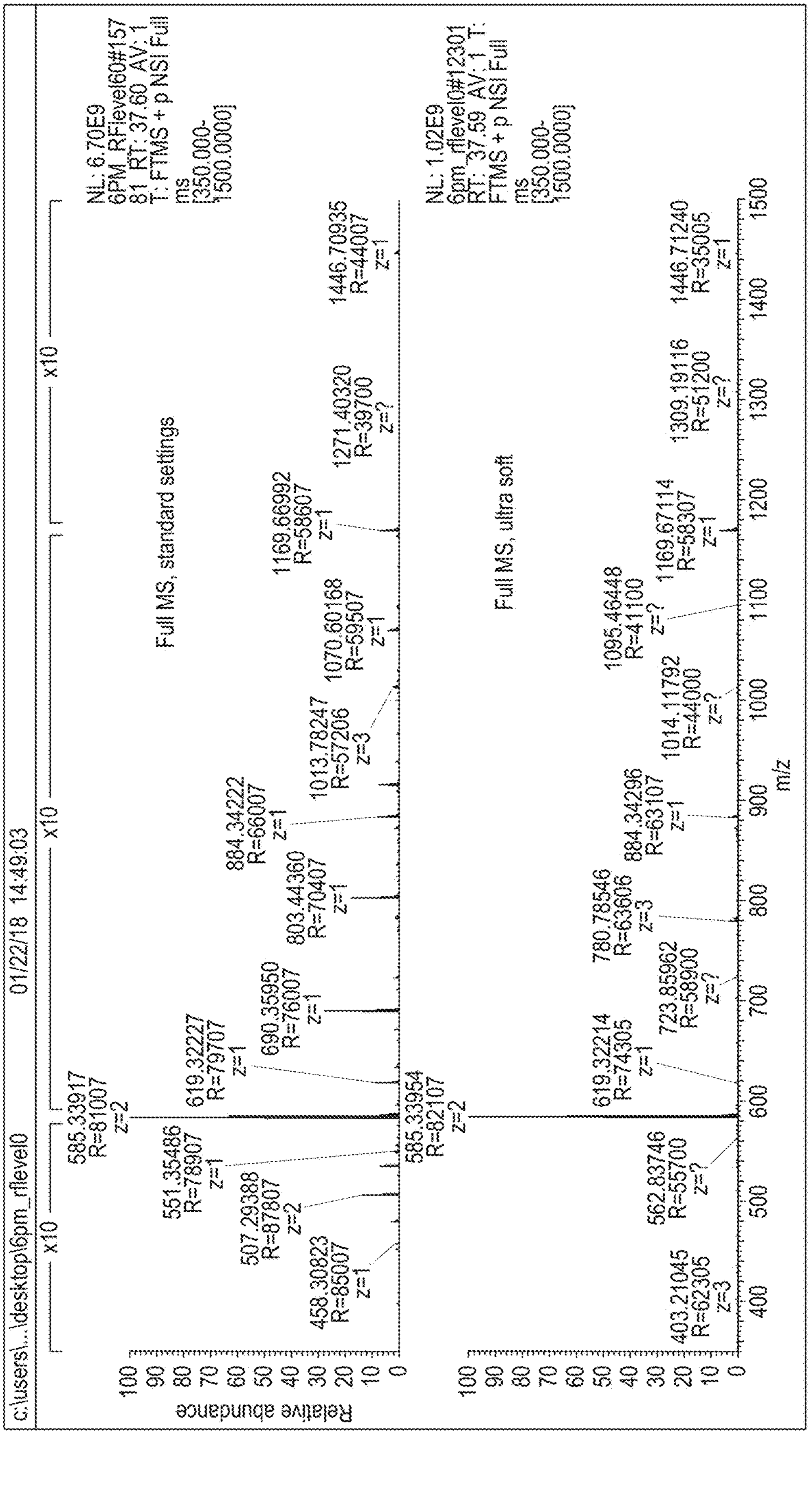
FIG. 6 shows a graphical representation of the data shown in FIG. 5 following analysis by the method of this disclosure.

FIG. 6 is a graphical representation of the data shown in FIG. 5 following analysis by a method analysing mass spectral peaks according to an embodiment of this disclosure.

Accordingly, peaks in the first MS1 scan have been compared against corresponding peaks in the second MS1 scan. In accordance with the methods of this disclosure, the peak at m/z=585.3 is determined to be a precursor ion mass spectral peak. Other ion transport induced fragments are also indicated in the first MS1 scan. The determined precursor ion mass spectral peak at m/z 585.3 is known to correspond to the VGPLLAC(carboxymethyl)LLGR tryptic peptide included in the sample.

Figure 7:
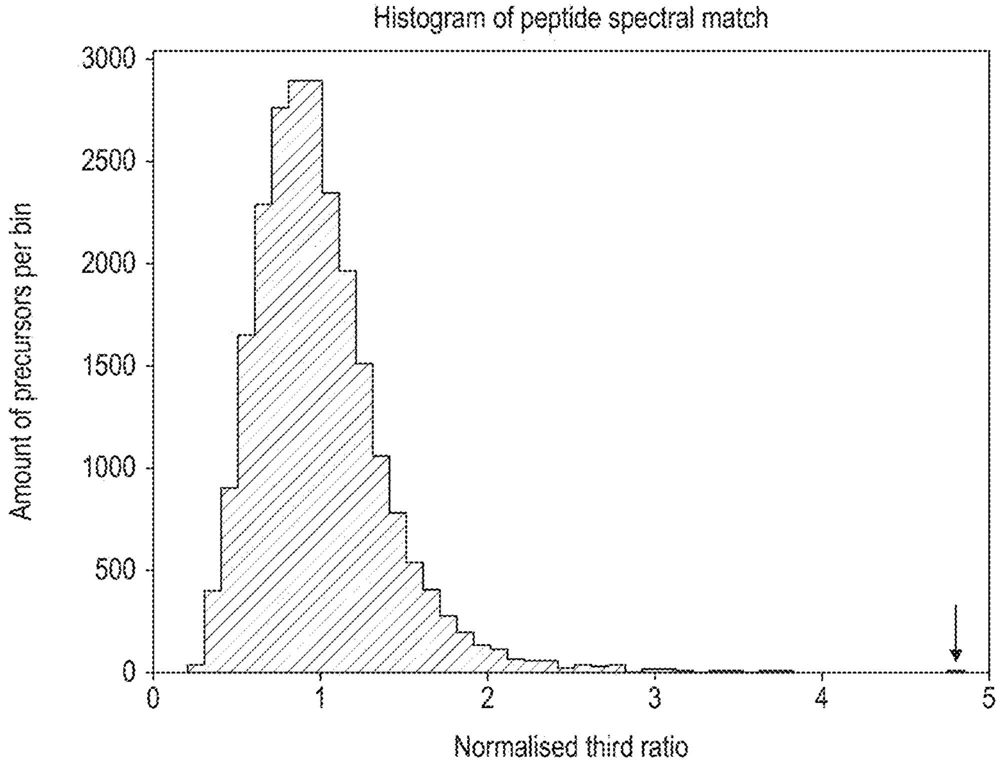
FIG. 7 shows a histogram of precursor ions following a mass spectrometry experiment according to an embodiment of this disclosure.

FIG. 7 shows a histogram of precursor ions following a mass spectrometry experiment according to an embodiment of this disclosure. In the mass spectrometry experiment of FIG. 7, a mass spectrometer 10 was used to mass analyse a HeLa digest with first and second MS1 scans according to this disclosure. For each mass spectral peak detected in the first and second MS1 scans, first, second and third ratios according to this disclosure were calculated. The third ratios calculated following analysis of the mass spectral peaks identified in the two MS1 scans were normalised against the fourth ratio (reference leve (and plotted as a histogram in FIG. 7 (i.e. 1 is indicative of the third ratio equal to the fourth ratio). As shown in FIG. 7, a number of mass spectral peaks with a normalised third ratio greater than 2 are identified by the analysis, with some mass spectral peaks having a normalised third ratio in excess of 4 (as indicated by arrow in FIG. 7). Such mass spectral peaks may be indicative of precursor ions which are susceptible to ion transport induced fragmentation, and so would typically be difficult to analyse using "standard" ion transport settings.

In some embodiments of this disclosure, the reference level may be calibrated to account for mass to charge ratio dependent variations in the criteria for determining whether a mass spectral peak is indicative of a precursor ion mass spectral peak. As such, a (predetermined) reference level used for determining whether a first or third ratio of a mass spectral peak is indicative of a precursor ion mass spectral peak may be calibrated to include a mass to charge ratio dependency.

For example, a mass spectrum for some samples may be mostly composed of ion transport induced fragments. Accordingly, a ratio of intensities (e.g. XIC, SN) against a reference level based on the total ion induced currents (TIC) or an average signal to noise ratio ($SN_A$) may be less sensitive to the detection of fragmented ions as the quantity of fragmented ions may still be significantly present in the lower energy second MS1 scan. Thus, the reference level may for the mass spectrometer be calibrated based on reference measurements of mass spectral peak intensity at first and second electric field settings. The reference measurements may be performed in advance using a known reference sample and stored by the controller for future measurements.

In a further embodiment of the disclosure, the mass spectrometer 1 of FIG. 1 may be further modified to include an ion activating device. The ion activating device may be configured to activate ions which are being transported by any of the ion transport devices (capillary 25, SRIG 30, injection flatapole 40, bent flatpole 50, ion gate (TK lens) 60, quadrupole mass filter 70, quadrupole exit lens/split lens arrangement 80, transfer multipole 90, and C-trap 100) into the orbital trapping device 110. The ions do not necessarily have to be stored to be activated by the ion activating device. For example, the ion activating device may be configured to activate ions in the injection flatapole 40.

For example, in some embodiments, it may be desirable to activate ions in order to desolvate precursor ions, where a cluster of precursor-solvent ions is present in the sample. The ion activating device may impart energy to the ions for the first MS1 scan such that the intensity of precursor-solvent cluster ions is reduced in the first MS1 scan. In the second MS1 scan, the ion activating device may be inactive (i.e. impart no energy), or operated with reduced intensity such that there is less desolvation of the precursor-solvent cluster ions. As such, there may a difference in the intensity of precursor-solvent cluster ions between the first and second MS1 scans which may allow precursor ion mass spectral peaks to be identified through comparison of the mass spectral peaks of the first and second MS1 scans. Certain ion transport induced fragments may also be indicated in the first MS1 scan through comparison of the mass spectral peaks of the first and second MS1 scans.

The ion activating device may be a source of laser radiation, an electron beam source, an ion beam source, or a molecular beam source. The source of laser radiation may provide a laser radiation of a wavelength suitable to activate the precursor ions to be analysed. For example, the laser may be an infra-red laser, a visible light laser or a UV laser. The ion activating device is configured to impart energy to the ions, but not to intentionally fragment the ions.

Accordingly, the method and systems of this disclosure may be calibrated to account for mass dependant variations in the transmission of ions through the ion transport devices of the mass spectrometer. It will be appreciated that, for some mass spectrometers, mass dependent transmission efficiency may affect the intensity with which fragment ions are identified. By calibrating the controller to account for transmission efficiency, the method may be improved to more accurately detect ion transport induced fragments.

The systems and methods of this disclosure analyse mass spectral peaks based on various relationships between parameters associated with the first and second MS1 scans. The relationships between the parameters are described herein as various ratios. The ratios defined herein are generally presented as a ratio of a parameter associated with the second MS1 scan to a parameter associated with the first MS1 scan. Of course, it will be appreciated that the relationships between the parameters associated with the first and second MS1 scans, and the associated criteria for analysing mass spectral peaks may also be represented by inverses of the ratios described in this disclosure. Thus, in this disclosure it is intended that reference to a determination/calculation "based on" a ratio encompasses any determination/calculation that utilises any inverses of said ratios or criteria.

In a further embodiment of this disclosure, a method of data dependent mass spectrometry is provided. The data dependent method of mass spectrometry performs first and second MS1 scans and analyses the mass spectral peaks substantially in accordance with the methods outlined above. By determining which mass spectral peaks in the first and/or second MS1 scans are indicative of precursor ions, subsequent data dependent analysis may be focused on precursor ions of interest. In other words, any mass spectral peaks identified as being indicative of fragment ions can be excluded from the subsequent data dependent analysis. As such, the subsequent method steps and analysis may be simplified through the elimination of ion transport induced fragments from further analysis.

As such, the method of data dependent mass spectrometry may use the information from the first and second MS1 scans to mass select ions with a mass to charge ratio indicative of a precursor ion for MS2 analysis. For the mass spectrometer 10 of this disclosure, the step of mass selecting a third set of ions may be performed by the quadrupole mass filter 70. The third set of ions may then be (intentionally) fragmented in the fragmentation chamber 120 to produce a set of fragmented ions. These fragmented ions may then be transported to the orbital trapping device 110 for mass analysis. The resulting scan of the fragmented ions is denoted an MS2 scan.

In one embodiment of data dependent mass spectrometry, the top N most abundant precursor ion species may be selected for MS2 analysis. The selection of the top N precursor ion species may take into account the mass spectral peaks determined as being indicative of a precursor ion mass spectral peak form the MS1 scans. As such, ions having a mass to charge ratio corresponding to mass spectral peaks which are not determined to be indicative of precursor ions (i.e. ion transport induced fragment ions) may be disregarded by the mass spectrometer and not further analysed.

Methods of data dependent analysis (DDA) for mass spectrometry are well known to the skilled person. Accordingly, the method of data dependent mass spectrometry described herein may incorporate any other steps or features of DDA known to the skilled person.

In another embodiment of this disclosure, a method of data independent mass spectrometry is provided.

In general, methods of data independent mass spectrometry comprise performing an MS1 scan over a wide range of m/z (a full range MS1 scan) and a plurality of MS2 scans. For each MS2 scan, a mass filter (e.g. quadrupole mass filter 70) is set to select a group of precursor ions having a relative range of m/z. The mass selected precursor ions are then fragmented in a fragmentation chamber (e.g. fragmentation chamber 120) and the resulting fragments are subsequently analysed. As such, a data independent method of mass spectrometry comprises performing an MS1 scan covering the mass range of interest, and a plurality of data independent MS2 scans.

According to the method of data independent mass spectrometry of this disclosure, the method of mass spectrometry is performed in order to obtain an MS1 scan over the mass range of interest. As such, first and second MS1 scans are obtained, wherein an energy used to transport the second set of the precursor ions to the mass analyser is less than the energy used to transport the first set of the precursor ions to the mass analyser. A plurality of data independent MS2 scans may also be performed in order to obtain data suitable for data independent analysis.

The method of data independent mass spectrometry may provide a data set for DIA which is easier to analyse as mass spectral peaks in the MS1 scans may be more easily characterised. For example, prior to analysing the MS2 data, mass spectral peaks indicative of precursor ions may be identified from the MS1 data alone, thereby simplifying the processing of the data.

Figure 8:
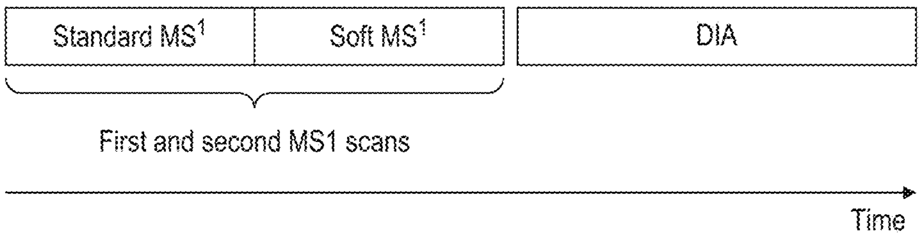
FIG. 8 shows a graphical representation of a method of data independent mass spectrometry.

For example, in one embodiment of data independent mass spectrometry shown graphically in FIG. 8, a first MS1 scan may be performed under "standard" ion transport device settings and a second MS1 scan may be performed under "soft" ion transport settings. As such, the second MS1 scan may be performed with the ion transport devices imparting less energy on the precursor ions for the second MS1 than the energy imparted on the precursor ions for the first, "standard" MS1 scan. The two MS1 scans may be performed sequentially followed by the plurality of data independent MS2 scans. In other embodiments, the first and/or second MS1 scan may be performed after the plurality of MS2 scans, or interspersed between some of the MS2 scans.

Methods of DIA mass spectrometry are well known to the skilled person. Accordingly, the method of DIA spectrometry described herein may incorporate any other steps or features of DIA known to the skilled person. In particular, it is noted that the two MS1 scans and the plurality of MS2 scans may be performed in any order.

Whilst the mass spectrometer 1 shown in FIG. 1 comprises one mass analyser (orbital trapping device 110), in other embodiments, a mass spectrometer may comprise a plurality of mass analysers, such as a first mass analyser and a second mass analyser. An example is the Orbitrap Fusion™ Tribrid mass spectrometer, which comprises a linear ion trap mass analyser and an orbital trapping mass analyser, capable of different maximum mass resolutions. Such configurations may increase the duty cycle due to parallelization of various instrument operations. For example, in the DDA and DIA methods described above, the mass spectrometer (via its controller) may be configured to perform the MS1 scans using the first mass analyser and the at least one MS2 scan using the second mass analyser. In some embodiments, the first mass analyser is configured to perform the MS1 scans at a higher mass resolution than the second mass analyser is configured to perform the MS2 scans.

It will be appreciated that the present disclosure is not limited to the embodiments described above and that modifications and variations on the embodiments described above will be readily apparent to the skilled person. Features of the embodiments described above may be combined in any suitable combination with features of other embodiments described above as would be readily apparent to the skilled person and the specific combinations of features described in the above embodiments should not be understood to be limiting.

The invention claimed is:

1. A method of mass spectrometry comprising:

ionising a sample to produce a plurality of precursor ions;

performing a first MS1 scan comprising:

transporting a first set of the precursor ions to a first mass analyser using an ion transport device operated at a first setting; and mass analysing the first set of the precursor ions;

performing a second MS1 scan comprising:

transporting a second set of the precursor ions to a second mass analyser using the ion transport device operated at a second setting; and mass analysing the second set of the precursor ions;

wherein the first setting and the second setting of the ion transport device are provided such that an energy imparted on the second set of precursor ions by the ion transport device is less than the energy imparted on the first set of precursor ions by the ion transport device; and determining if a mass spectral peak in at least one of the first MS1 scan or the second MS1 scan is indicative of a precursor ion mass spectral peak based on relative intensities of mass spectral peaks of the first and second MS1 scans.

2. The method of mass spectrometry according to claim 1, wherein the ion transport device comprises electrodes configured to provide an RF and/or D.C electric field for ion transport, wherein a magnitude of the RF and/or D.C electric field for the first setting is larger than the magnitude of the RF and/or D.C electric field for the second setting.

3. The method of mass spectrometry according to claim 1, wherein the intensity of the mass spectral peak in the first and/or second MS1 scans is based on:

an extracted ion current of the mass spectral peak measured by the first/second mass analyser; or a signal to noise ratio of the peak.

4. The method of mass spectrometry according to claim 1, wherein a mass spectral peak having a first mass to charge ratio in the first and second MS1 scans is determined to be indicative of a precursor ion mass spectral peak based on a first ratio of an intensity of the mass spectral peak in the second MS1 scan to an intensity of the mass spectral peak in the first MS1 scan.

5. The method of mass spectrometry according to claim 4, wherein a mass spectral peak having a first mass to charge ratio in the first and second MS1 scan is determined to be indicative of a precursor ion mass spectral peak based on the first ratio relative to a second ratio of an average intensity of the mass spectral peaks of the second MS1 scan to an average intensity of the mass spectral peaks of the first MS1 scan.

6. The method of mass spectrometry according to claim 5, wherein the average intensity of the mass spectral peaks of the first MS1 scan and/or the average intensity of the mass spectral peaks of the second MS1 scans may be based on:

an average of the extracted ion current of the mass spectral peaks measured by the first and/or second mass analyser for the respective scan; or an average of the signal to noise ratio for the mass spectral peaks of the respective scan.

7. The method of mass spectrometry according to claim 5, wherein a mass spectral peak in the first and second MS1 scan is determined to be indicative of a precursor ion mass spectral peak based on:

a third ratio of the first ratio to the second ratio, relative to a reference level.

8. The method of mass spectrometry according to claim 7, wherein the reference level is equal to a fourth ratio of an injection time for the first MS1 scan to an injection time for the second MS1 scan.

9. The method of mass spectrometry according to claim 7, wherein the reference level is calibrated according to the mass to charge ratio of the mass spectral peak to be analysed.

10. The method of mass spectrometry according to claim 7, wherein the reference level is calibrated based on reference measurements of mass spectral peak intensity at first and second settings for a plurality of mass to charge ratios.

11. The method of mass spectrometry according to claim 7, wherein a mass spectral peak is determined to be a precursor ion mass spectral peak if:

the third ratio is at least X% of the reference level, where X is at least: 10%, 20%, 30%, 40%, 50% or 60%; and/or the third ratio is no greater than 500%, 400%, 300%, 200% or 150% of the reference level.

12. The method of mass spectrometry according to claim 1, wherein the first mass analyser is the same as the second mass analyser; or the first mass analyser is different from the second mass analyser.

13. The method of mass spectrometry according to claim 1, wherein one or both of the first mass analyser and the second mass analyser are a Fourier Transform mass analyser.

14. The method of mass spectrometry according to claim 1, further comprising:

performing an MS2 scan comprising:

mass selecting a third set of the precursor ions based on a mass to charge ratio corresponding to a determined precursor ion mass spectral peak;

fragmenting the third set of the precursor ions to produce a set of fragmented ions; and mass analysing the fragmented ions.

15. The method of mass spectrometry according to claim 1, further comprising:

performing a plurality of data independent MS2 scans.

16. A mass spectrometer for analysing a sample comprising:

an ionisation source configured to ionise a sample to produce a plurality of precursor ions;

at least one mass analyser;

an ion transport device configured to transport precursor ions from the ionisation source to the mass analyser;

a controller configured:

(i) to perform a first MS1 scan by:

causing the ion transport device to transport a first set of the precursor ions to a first mass analyser using a first setting of the ion transport device;

mass analysing the first set of the precursor ions using the first mass analyser;

(ii) to perform a second MS1 scan by causing the ion transport device to transport a second set of the precursor ions to a second mass analyser using a second setting of the ion transport device;

mass analysing the second set of the precursor ions using the second mass analyser;

wherein the second setting of the ion transport device is configured to impart a lower amount of energy on the second set of precursor ions than an amount of energy imparted by the first setting of the ion transport device on the first set of precursor ions (iii) to analyse a mass spectral peak in the first and/or second MS1 scan by determining if a mass spectral peak in at least one of the first or second MS1 scan is indicative of a precursor ion mass spectral peak based on relative intensities of the mass spectral peaks of the first and second MS1 scans.

17. The mass spectrometer according to claim 16, wherein the ion transport device further comprises an ion activation device configured to impart energy on the first and second sets of precursor ions wherein a magnitude of the energy imparted for the first setting is larger than the magnitude of the energy imparted for the second setting.

18. The mass spectrometer according to claim 16, wherein the controller is configured to determine if a mass spectral peak having a first mass to charge ratio in the first and/or second MS1 scan is indicative of a precursor ion mass spectral peak based on a first ratio of an intensity of the mass spectral peak in the second MS1 scan to an intensity of the mass spectral peak in the first MS1 scan.

19. The mass spectrometer according to claim 18 wherein the intensity of the mass spectral peak in the first and/or second MS1 scans is based on:

an extracted ion current of the mass spectral peak measured by the first/second mass analyser; or a signal to noise ratio of the mass spectral peak measured by the first/second mass analyser.

20. The mass spectrometer according to claim 18, wherein the controller is configured to determine if a mass spectral peak having a first mass to charge ratio in the first and/or second MS1 scan is indicative of a precursor ion mass spectral peak based on the first ratio relative to a second ratio of an average intensity of the mass spectral peaks of the second MS1 scan to an average intensity of the mass spectral peaks of the first MS1 scan.

21. The mass spectrometer according to claim 20, wherein the average intensity of the mass spectral peaks of the first MS1 scan and/or the average intensity of the mass spectral peaks of the second MS1 scans is be based on:

an average of the extracted ion current of the mass spectral peaks measured by the first and/or second mass analyser for the respective scan; or an average of the signal to noise ratio of the mass spectral peaks measured by the first/second mass analyser for the respective scan.

22. The mass spectrometer according to claim 20, wherein the controller is configured to determine if a mass spectral peak in the first and/or second MS1 scan is indicative of a precursor ion mass spectral peak based on based on a third ratio of the first ratio to the second ratio, relative to a reference level.

23. The mass spectrometer according to claim 22, wherein the controller is configured to calibrate the reference level according to the mass to charge ratio of the mass spectral peak to be analysed or based on reference measurements of mass spectral peak intensity at the first and second settings for a plurality of mass to charge ratios.

24. The mass spectrometer according to claim 16, further comprising:

a fragmentation chamber, the fragmentation chamber connected to the ion source and the at least one mass analyser by the ion transport device, wherein the controller is further configured to perform at least one MS2 scan by:

causing the ion transport device to transport a third set of the precursor ions to the fragmentation chamber;

causing the fragmentation chamber to fragment the precursor ions to produce a set of fragment ions;

causing the ion transport device to transport the fragment ions to the at least one mass analyser;

performing the MS2 scan on the fragment ions using the at least one mass analyser.

25. The mass spectrometer according to claim 24, wherein the ion transport device comprises a mass selector, the controller further configured to perform the at least one MS2 scan by:

causing the mass selector to mass select the third set of precursor ions to be transported to the fragmentation chamber based on a determined precursor ion mass spectral peak.

26. The mass spectrometer according to claim 24, wherein the first mass analyser and the second mass analyser are different;

the controller configured to perform the MS1 scans using the first mass analyser and the at least one MS2 scan using the second mass analyser, wherein the ion transport device further comprises an ion activation device configured to impart energy on the first and second sets of precursor ions wherein a magnitude of the energy imparted for the first setting is larger than the magnitude of the energy imparted for the second setting.

27. The mass spectrometer according to claim 26, wherein the first mass analyser is an orbital trapping mass analyser, and/or the second mass analyser is a time of flight mass analyser or an ion trap.

28. The method of mass spectrometry according to claim 1, wherein the first MS1 scan and the second MS1 scan are performed without being subjected to an intentional fragmentation process.

* * * * *